United States Patent
Daugherty et al.

(10) Patent No.: US 6,758,931 B1
(45) Date of Patent: Jul. 6, 2004

(54) METHOD AND APPARATUS FOR APPLYING TIRE TREAD FOR A RETREAD TIRE

(75) Inventors: Estes M. Daugherty, Muscatine, IA (US); Steven W. Mory, Muscatine, IA (US)

(73) Assignee: Bandag, Incorporated, Muscatine, IA (US)

( * ) Notice: Subject to any disclaimer, the term of this patent is extended or adjusted under 35 U.S.C. 154(b) by 0 days.

(21) Appl. No.: 09/491,964

(22) Filed: Jan. 27, 2000

(51) Int. Cl.$^7$ .......................... B29D 30/52; B29D 30/54

(52) U.S. Cl. ................. 156/128.1; 156/130; 156/405.1; 156/406.4; 156/406.6

(58) Field of Search .......................... 156/128.1, 128.6, 156/96, 909, 421.6, 130, 396, 405.1, 406.4, 406.6, 130.3

(56) References Cited

U.S. PATENT DOCUMENTS

| | | | |
|---|---|---|---|
| 1,124,412 A | | 1/1915 | Gammeter |
| 1,966,087 A | | 7/1934 | Bostwick |
| 2,675,855 A | | 4/1954 | Heintz |
| 3,397,099 A | | 8/1968 | Barefoot |
| 3,698,975 A | | 10/1972 | Hogan, Jr. |
| 3,728,181 A | | 4/1973 | Simmons, Jr. |
| 3,753,821 A | | 8/1973 | Ragen |
| 3,855,030 A | * | 12/1974 | Schelkmann ................. 156/130 |
| 3,951,719 A | | 4/1976 | Hough |
| 3,964,949 A | | 6/1976 | Kent et al. |
| 3,989,563 A | | 11/1976 | Schelkmann |
| 4,062,716 A | * | 12/1977 | Galantine ................... 156/361 |
| 4,096,008 A | | 6/1978 | Taylor |
| 4,149,926 A | | 4/1979 | Taylor |

(List continued on next page.)

FOREIGN PATENT DOCUMENTS

| | | |
|---|---|---|
| CA | 2120473 A1 | 10/1994 |
| DE | 21 05 765 A | 8/1972 |
| DE | 37 30 923 A1 | 3/1989 |
| EP | 0 104 812 A2 | 4/1984 |
| EP | 0 230 142 A1 | 12/1986 |
| EP | 0 253 793 A3 | 1/1988 |
| EP | 0 253 793 A2 | 1/1988 |
| EP | 0 454 094 A2 | 4/1991 |
| EP | 0 454 094 A3 | 4/1991 |
| EP | 0 444 573 A1 | 9/1991 |
| EP | 0 528 683 A1 | 2/1993 |
| EP | 730 950 A2 | 9/1996 |
| EP | 730950 A3 | 4/1997 |
| EP | 0 955 154 A1 | 11/1999 |
| GB | 2234718 * | 2/1991 |
| WO | WO 96/27493 | 9/1996 |

OTHER PUBLICATIONS

U.S. patent application Ser. No. 08/773,864, Bender et al., filed Dec. 27, 1996.
U.S. patent application Ser. No. 09/491,661, Gridley et al., filed Jan. 27, 2000.

(List continued on next page.)

*Primary Examiner*—Michael W. Ball
*Assistant Examiner*—Justin Fischer
(74) *Attorney, Agent, or Firm*—Leydig, Voit & Mayer, Ltd.

(57) ABSTRACT

An apparatus for retreading tires is disclosed. The apparatus has a rotatable hub for the mounting of a buffed tire casing. The apparatus also has a cushion gum applicator that is configured to stretch a length of cushion gum onto a tire casing. Further, the apparatus has a tread dispenser that is configured to automatically dispense a length of tire tread based on the circumference of at least one of the tire casing and the tire casing plus the cushion gum. Further still, the apparatus includes a tread applicator that is configured to stretch the length of tire tread onto the cushion gum. The entire apparatus including the cushion gum applicator, the tread dispenser, and the tread applicator are integrated into a single tire bench machine.

13 Claims, 5 Drawing Sheets

U.S. PATENT DOCUMENTS

| | | |
|---|---|---|
| 4,371,411 A | 2/1983 | Honda et al. |
| 4,410,389 A | 10/1983 | Cole et al. |
| 4,600,467 A | 7/1986 | Perdue |
| 4,804,426 A | 2/1989 | Okuyama et al. |
| 5,135,601 A | 8/1992 | Klose et al. |
| 5,175,930 A | 1/1993 | Okuyama et al. |
| 5,277,727 A | 1/1994 | Seiler et al. |
| 5,292,398 A | 3/1994 | Miyamoto et al. |
| 5,306,130 A | 4/1994 | King et al. |
| 5,342,462 A | 8/1994 | King et al. |
| 5,342,473 A | 8/1994 | Bibona et al. |
| 5,354,406 A | 10/1994 | King et al. |
| 5,364,490 A | 11/1994 | Hilke et al. |
| 5,427,636 A * | 6/1995 | Chabin ................. 156/64 |
| 5,458,727 A | 10/1995 | Meyer |
| 5,503,940 A | 4/1996 | Majumdar et al. |
| 5,882,457 A * | 3/1999 | Currie ................. 156/130 |
| 5,942,059 A * | 8/1999 | Wulker ................. 156/64 |
| 6,251,204 B1 | 6/2001 | Andersson et al. |

OTHER PUBLICATIONS

U.S. patent application Ser. No. 09/492,469, Daugherty et al., filed, Jan. 27, 2000.

U.S. patent application Ser. No. 09/492,602, Gridley et al., filed Jan. 27, 2000.

Bandag, brochure (2 pages), Model 9102E tire builder, Apr. 1997.

* cited by examiner

METHOD AND APPARATUS FOR APPLYING TIRE TREAD FOR A RETREAD TIRE

FIELD OF THE INVENTION

The invention relates generally to a method and apparatus for making retreaded tires and particularly to a method of and apparatus in which the steps in making a retreaded tire are combined on a single integrated machine.

BACKGROUND OF THE INVENTION

Retreaded tires are readily available and provide an economical way to gain additional use out of tire casings after the original tread or retread has become worn. According to a conventional method of retreading, sometimes referred to as cold process retreading, worn tire tread on a used tire is removed by a special buffing machine that grinds away old tread and leaves a buffed surface to which a new layer of tread may be bonded.

Removal of old tread from the tire casing provides a generally smooth treadless surface about the circumference of the tire casing. The tire casing may then be examined for injuries, which are skived and filled with a repair gum. After completion of the skiving process, the buffed surface may be sprayed with a tire cement that provides a tacky surface for application of bonding material and new tread. Next a layer of cushion gum is applied to the back, i.e., the inside surface of a new layer of tread, or alternatively, the layer of cushion gum is applied directly to the tacky surface on the tire casing. Conventionally, the cushion gum is a layer of uncured rubber material. The cushion gum and tread may be applied in combination about the circumference of the tire casing to create a retreaded tire assembly ready for curing. Alternatively, a length of tire tread is wrapped around the tire casing with the cushion gum already applied. The cushion gum forms the bond between the tread and the tire casing during curing.

Following assembly of the tire casing, cement, cushion gum and tread, the overall retreaded tire assembly is placed within a flexible rubber envelope. An airtight seal is created between the envelope and the bead of the tire. The entire envelope tire assembly is placed within a curing chamber, and subjected to pressure and a raised temperature for a specific period of time. The combination of pressure, temperature, and time binds a layer of cushion gum to both the tire casing and the new tire tread.

The above-described method of cold process retreading is often accomplished on a tire builder. Conventional tire builders include a spindle on which a tire is mounted and a spindle on which a roll of tire cushion gum is mounted for dispensing. Typically the cushion gum may be dispensed by hand as the tire is rotated to adhere the cushion gum to the tire casing.

In certain applications, it may be advantageous to eliminate the spray cement completely. This may be particularly true in geographical areas where there is increased regulation of the use of chemicals within spray cement products. Further, use of spray cement can also add to the cost of producing retreaded tires due to the product cost and equipment cost. Various solutions to enable a cementless process have been suggested, for example, extruding heated cushion gum directly to a tire casing. This process however, is costly due to equipment costs and is unnecessarily complex.

After the cushion gum has been applied, the circumference of the tire casing with cushion gum is measured and an applicable length of tread is measured out, conventionally on a separate bench. The tire tread is manually cut to length.

In all tire building systems once the cushion gum has been applied and the tread has been cut to length, the tread must be applied to the cushion gum and casing. Due to errors in the cut length of the tire tread it may be desirable to stretch the tire tread around the perimeter of the tire casing and cushion gum in order to create an appropriately sized splice.

Further, it is often desirable, for aesthetic and structural strength purposes, to match the tire tread design at each end of the tire tread length so that where the two ends of the tire tread length match at the splice, the repetitive pattern of the tire tread design is substantially continuous. To create such a splice, it may be necessary to stretch the tire tread around the circumference of the tire casing and cushion gum because the tire tread length may have been cut to an extra shortened length in order to cause the matching of the tire tread design at the two ends of the tire tread.

Accordingly, there is a need for an integrated tread bench that combines the processes of cushion application, tread cutting and tread application into a single work bench machine while semi-automating the plurality of steps required to produce a finished retread tire prior to curing. There is also a need for a cushion gum application process and apparatus that controls the stretch of the cushion gum during application to the tire casing. Further, there is a need for a method and apparatus for applying cushion gum to a tire casing that uses a cementless application and stitching process. Further, there is a need for a semi-automatic method and apparatus for cutting an appropriate length of tire tread. Further still, there is a need for a semi-automatic method and apparatus of applying tire tread in a controlled stretch to a casing with an applied cushion gum to produce a tire with a predetermined range of splice size. Yet further still, there is a need for a semi-automatic method and apparatus of cutting and applying tire tread lengths such that the periodic tire tread design is substantially continuous in the retread tire.

SUMMARY OF THE INVENTION

An exemplary embodiment of the invention relates to a tread application apparatus for use in applying a length of tire tread to a tire casing. The apparatus includes a rotatable hub for mounting a tire casing, the tire casing having a circumference. The apparatus also includes a track configured to provide the length of tire tread to the casing, the length of tire tread having a first end and a second end. Further, the apparatus includes a variable force applicator configured to apply the length of tire tread onto the casing.

Another exemplary embodiment of the invention relates to a tread application apparatus for use in applying a length of tire tread to a tire casing having an applied cushion gum. The tread application apparatus includes a rotatable hub for mounting a tire casing, the tire casing having a circumference. The tread application apparatus also includes a track configured to provide the length of tire tread to the cushion gum, the length of tire tread having a first end and a second end. Further, the tread application apparatus includes a variable force applicator configured to apply the length of tire tread onto the cushion gum.

Still another exemplary embodiment of the invention relates to a method of applying a length of tire tread to a tire casing having a layer of cushion gum applied thereto. The method includes mounting a tire casing on a hub, the hub being rotatable. The method also includes applying the length of tire tread to the cushion gum. Further, the method includes controlling the pressure applied to the tire tread during application. Further still, the method includes monitoring the distance needed to be covered by the tire tread and monitoring the length of tire tread not applied to the cushion gum.

BRIEF DESCRIPTION OF THE DRAWINGS

The Invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
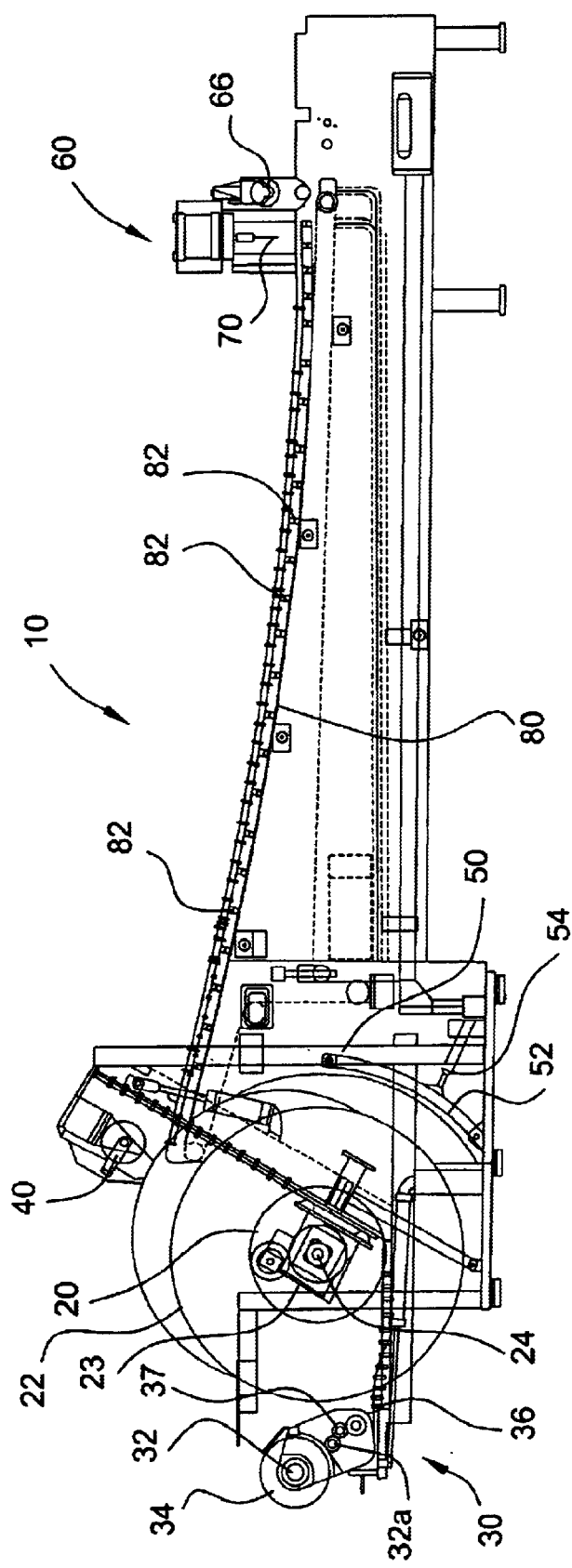
FIG. 1 is a mechanical drawing of an integrated tire bench system.
Figure 2:
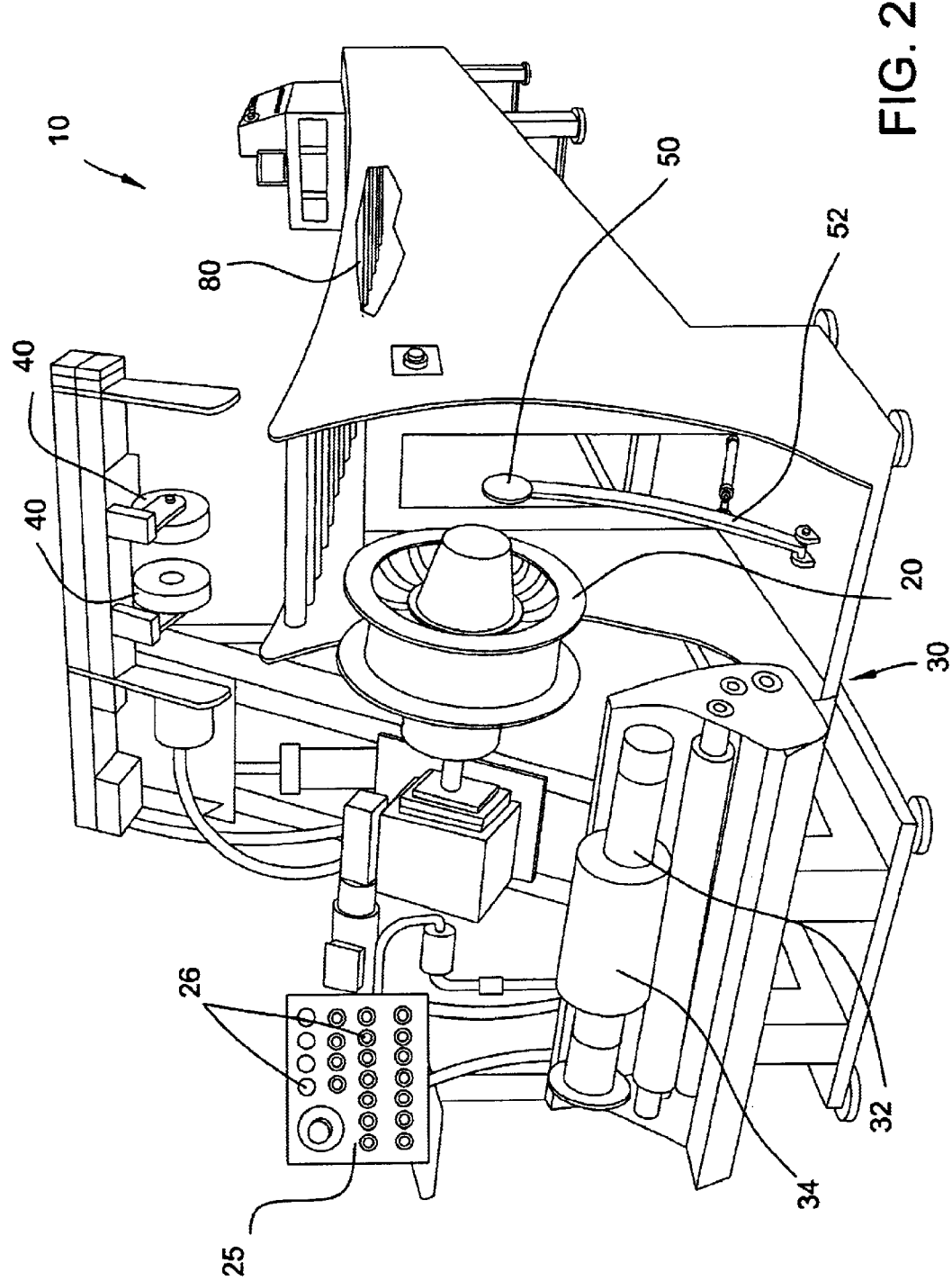
FIG. 2 is a perspective view of an integrated tire bench system.

Referring to FIGS. 1 and 2, an integrated tire bench 10 is depicted. Tire bench 10 is a semi-automated retread tire building apparatus configured to assemble retread tires. In an exemplary embodiment, tire bench 10 includes a rotatable hub 20 for mounting a tire casing thereon. In an exemplary embodiment, hub 20 may be a variable size hub that incorporates an automated inflation system and is configured to accommodate tires having different sizes (widths and radii).

Tread bench 10 includes an operator control panel 25 having a plurality of buttons and gauges 26 to partially control and monitor operations of tread bench 10. Tread bench 10 also includes a cushion gum applicator system 30. Cushion gum applicator system 30 includes a spindle 32 to which may be mounted a roll of cushion gum 34 provided for dispensing onto a tire casing 22 mounted on hub 20.

Cushion applicator system 30 also includes a drive wheel 36 that is configured to engage the surface of a tire casing and is driven by the rotation of tire casing 22. In an exemplary embodiment, drive wheel 36 is coupled to spindle 32a via a system of gears and/or belts 37, such that spindle 32a rotates with a surface velocity that is proportional to the surface velocity with which casing 22 is rotated by a drive system 23, rotating hub 20.

Further still, in an exemplary embodiment, tread bench 10 includes a set of applicator/stitcher wheels 40. Applicator/stitcher wheels 40 are movable relative to one another and may be moved adjacent one another to form a single applicator/stitcher wheel. Applicator/stitcher wheels 40 may be moved apart to perform stitching operations. Applicator/stitcher wheels 40 may also be moved in a direction substantially normal to the surface of the tire casing to apply a variably controlled force to the surface in contact with applicator/stitcher wheels 40.

A measurement wheel 50 is provided on a measurement arm 52. Measurement arm 52 is pivotable by actuation through a pneumatic cylinder 54 to engage a surface (either a tire casing, or cushion gum applied to a tire casing). Measurement wheel 50 rotates, as a tire casing 22 is rotated on an axis 24. Measurement wheel 50 is coupled to an encoding device which encodes the angular variation of measurement wheel 50 for communication to a central processing unit or control unit. In combination, wheel 50 with control unit yields appropriate measurement of wheel circumference. In alternative embodiments, other measurement devices may be incorporated into the design without departing from the spirit and scope of the invention.

Figure 3:
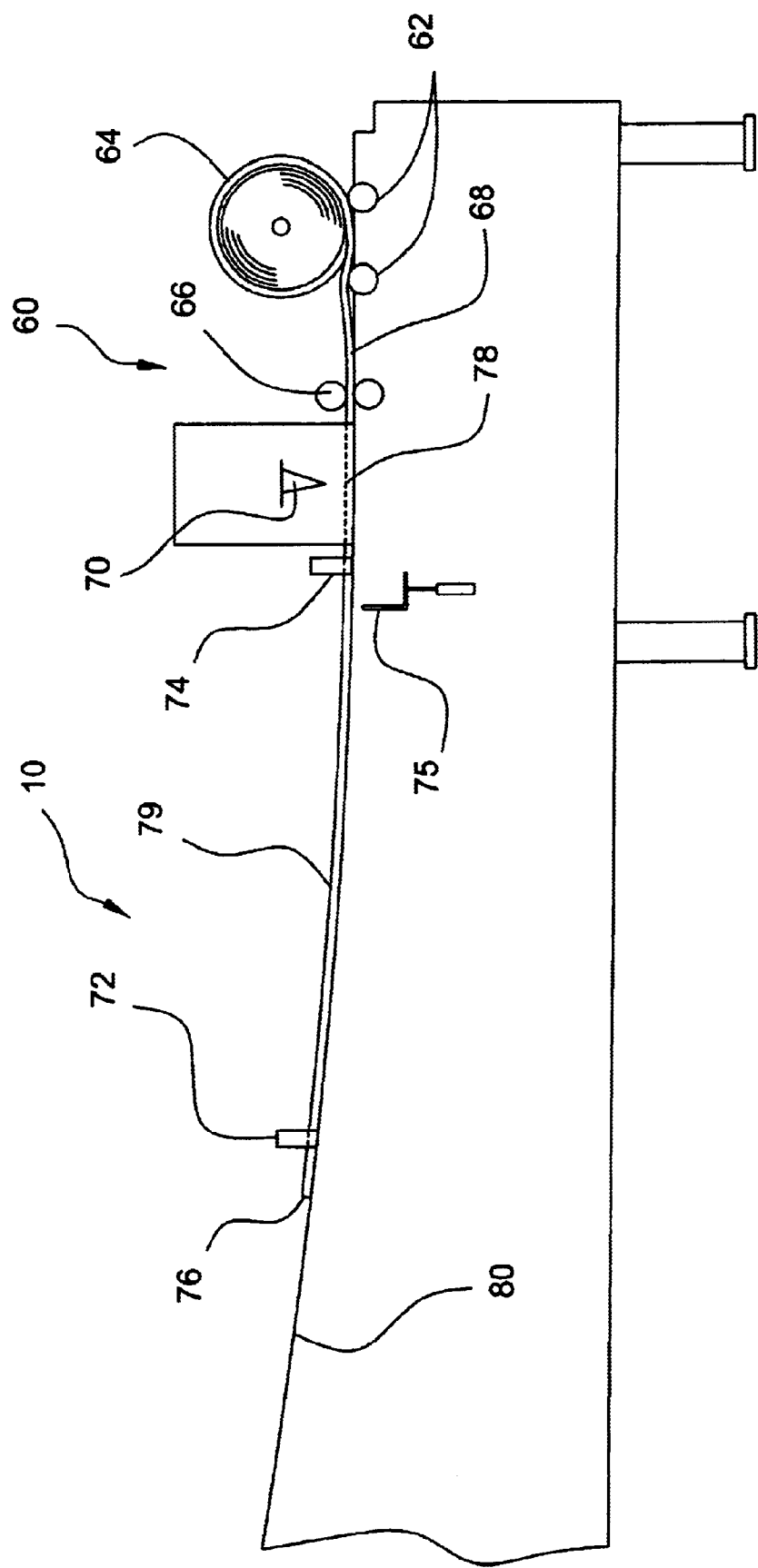
FIG. 3 is a partial elevation view of an integrated tire bench system.

Tread bench 10 also includes a tread dispensing system 60. Referring now to FIG. 3, tread dispensing system 60 includes a tread rollers 62 on which a roll of rubber tire tread 64 may be mounted. Tread dispensing system 60 also includes a set of drive rollers 66 which may be used to pull tire tread 68 from roll 64 and push out a length of tire tread 79 away from rollers 66. Tread dispensing system 60 also includes a knife 70 for cutting a length of tire tread 79 from uncut tread 68. Further still, tread dispensing system 60 includes a first clamp 72 and a second clamp 74. First clamp 72 is configured to clamp tire tread 68 at or near a first end 76. Second clamp 74 is configured to clamp tire tread 68 at or near a second end 78, created by knife 70.

Tire bench 10 includes a curved track that may be a set of rollers 82 mounted along curved track 80. Curved track 80 is configured as a curve to provide a desirable height for operator access at or near knife 70. Further, curved track 80 is configured to deliver tire tread section 79 to the end of track 80 adjacent casing 22, for assembly thereon, without introducing any substantial bending or stretching caused by abrupt changes in the path of travel of section 79 and further to facilitate the movement of first clamp 72 and second clamp 74 along track 80. Curved track 80 is also appropriately curved to allow a desirable height for operator access near knife 70 while providing adequate height at the opposite end to accommodate tires of large size.

In an exemplary embodiment, first clamp 72 pulls tread section 79 along track 80 to provide tread section 79 to contact casing 22. As tread section 79 is applied to tire casing 22, second end 78 is at a known location because clamp 74 includes an encoder (in communication with a central processing unit or control unit) configured to track the location of end 78 relative to end 76 which is engaged with casing 22. Both clamps 72 and 74 have encoders incorporated therein to track the location of clamps 72 and 74 along track 80. In an exemplary embodiment, the encoders of clamps 72 and 74 are able to measure changes every millimeter. However, encoders of clamps 72 and 74 are not limited to receiving data every millimeter but may be configured to receive information on larger or smaller scales. The measurement of changes every millimeter provides a substantially continuous location signal to a central processing unit or control unit used to control the application process. However, it may be desirable to provide substantially continuous monitoring with coarser or finer measurements.

In operation, an operator mounts a tire casing 22 to hub 20. Hub 20 may be moved laterally, along the axis of rotation in order to center hub 20 relative to a longitudinal center line of tread bench 10, which corresponds to the center line of cushion gum 34 and tire tread roll 64. Once the casing has been mounted, the casing is then inflated and centered. Therefore, the first step for the operator after mounting and inflating casing 22 is to align the center line of tire casing 22 with the center line of the cushion gum 34 and tire tread roll 64, which are automatically aligned with the tread bench 10 centerline by a system of clamps, guides, rollers, or other alignment devices. Next, measurement wheel 50 is brought into contact with the outer surface of casing 22. Tire casing 22 is rotated to provide a measurement of the circumference of casing 22. While casing 22 is rotated a full revolution, measurement wheel 50 encodes rotations of measurement wheel 50 which are communicated to a central processing unit or control unit where a determination of the circumference of tire casing 22 is calculated. From the measurement of the circumference of casing 22, a desired maximum angular velocity is determined, based on a desired value of the tangential velocity of points on the surface of casing 22 during cushion gum application.

In an exemplary embodiment it may be desirable to obtain a maximum tangential velocity of points on the surface of casing 22 during cushion gum application, for casings of various sizes, the maximum tangential velocity being constant across the range of sizes. To provide a constant maximum velocity across the range of sizes requires knowledge of the size (i.e., the circumference) of each casing. Alternatively, it may be desirable to vary the tangential velocity based on size, or it may be desirable to provide a constant angular velocity over the range of sizes.

Next, drive roller 36 is brought into contact with the outer surface of casing 22. A length of cushion gum is dispensed from roll 34 and applied to the surface of casing 22. Casing 22 is rotated and consequentially rotates both drive wheel 36 and spindle 32 causing the cushion gum to stretch and be applied to casing 22. To produce the controlled stretch of cushion gum 34, casing 22 is driven by the rotation of hub 20 through drive system 23. Drive wheel 36, which engages casing 22, is caused to rotate and drive a system of gears and/or belts 37 thereby driving spindle 32a at a linear surface velocity based proportionally on the linear surface velocity of casing 22. Gearing 37 is configured such that a linear velocity of cushion gum being dispensed from roll 34 is less than the tangential velocity of points on the perimeter of casing 22. Therefore, the differential velocity, that is the tangential velocity of a point on the perimeter of casing 22 minus the linear velocity of cushion gum leaving roll 34, is non-negative. The differential velocity therefore produces a stretching of cushion gum 34 as it is being applied to the exterior of casing 22.

Figure 5:
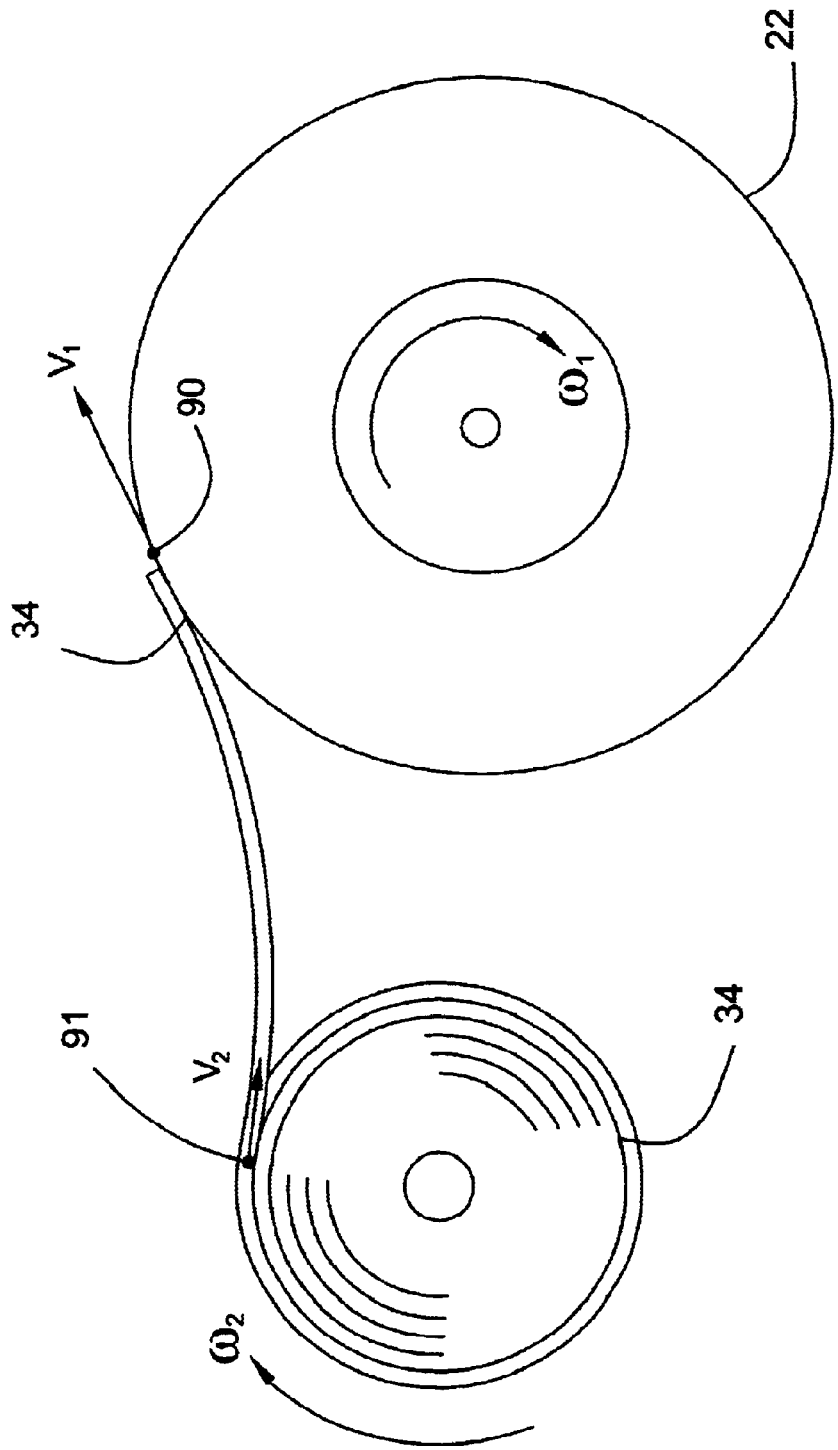
FIG. 5 is a depiction of the kinematics of a cushion gum application process.

Referring now to FIG. 5, to fully illustrate the cushion gum stretching process, roll 34 is depicted having an angular velocity $\omega_2$. Cushion gum 34 is shown being applied to casing 22, casing 22 having an angular velocity $\omega_1$. To cause stretching of cushion gum 34, a point 90 on the surface of casing 22 has a velocity V1, a point 91 on the cushion gum, being dispensed from the roll 34, has a velocity V2. Because $\omega_1$ and $\omega_2$ are geared to provide different V2 and V1, where V1 is greater than V2, a differential velocity $\Delta V = V1 - V2$, that is non-negative is created. Therefore, due to the differential velocity, the cushion gum is necessarily stretched.

Figure 4:
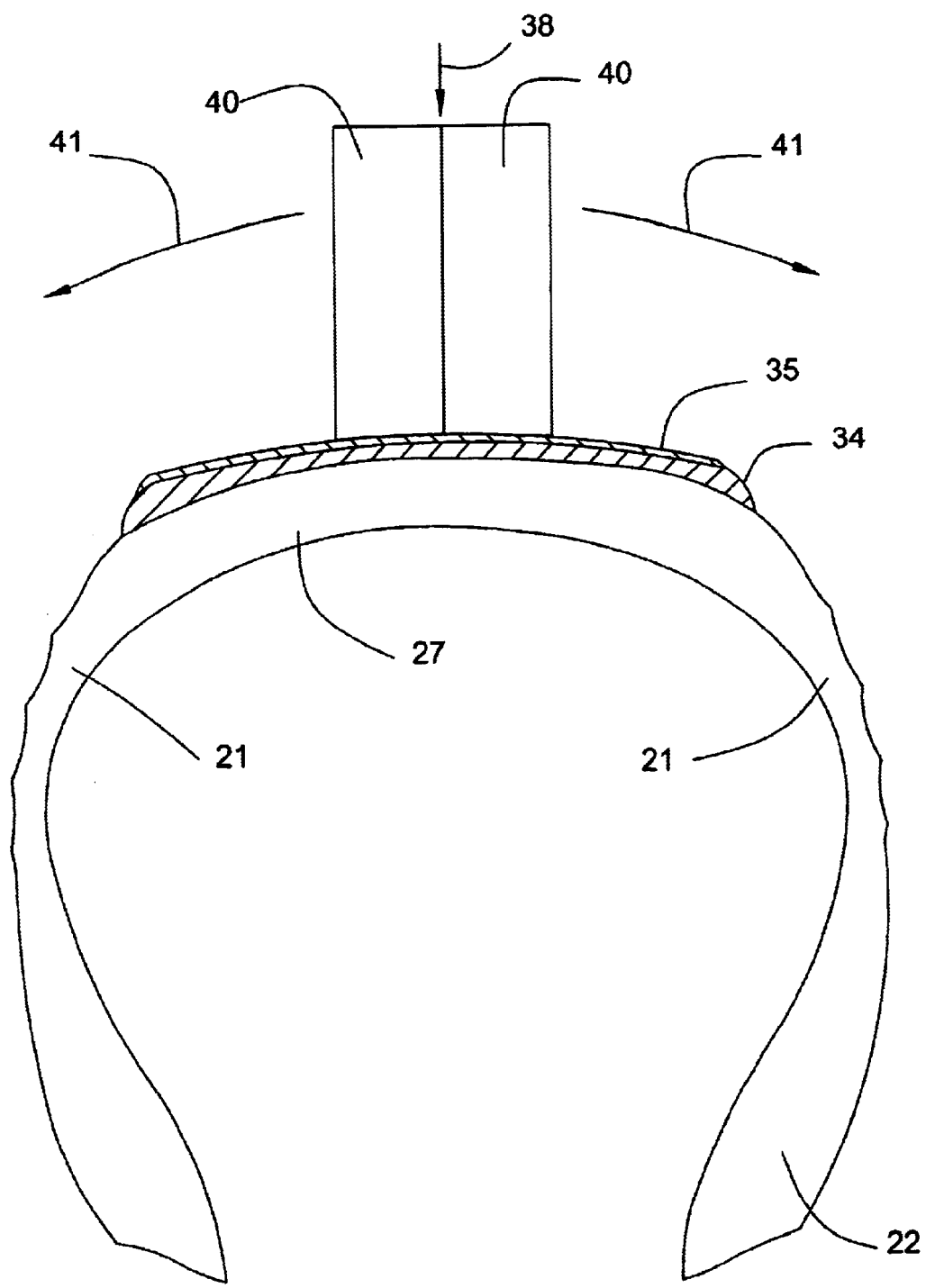
FIG. 4 is a cross-sectional view of a tire casing in an application or stitching operation.

As depicted in FIG. 4, casing 22 has a curved crown section 27. Crown 27 is substantially the surface to which cushion gum 34 is applied. In an exemplary embodiment, cushion gum 34 has a polyethylene protective layer 35 adhered thereto, to prevent adhesion to other layers of cushion gum while rolled and to prevent adhesion to application rollers 40 during application. The controlled stretching of cushion gum 34, by the differential velocity introduced by gears 37, provides improved conformity of cushion gum 34 to the contoured crown 27 of casing 22. The improved conformity provides uniform adhesion and contact of cushion gum 34 to crown 27 causing the cushion gum edge to substantially contact casing 22 wrinkle-free and further reduces the need for providing extra strips of cushion gum along shoulders 21 of crown 27 (i.e., cushion gum stripping).

Because measurement of the circumference of casing 22 was provided by measurement wheel 50, the known length of cushion gum 34 is dispensed to fully encompass the perimeter of casing 22.

After cushion gum 34 has been applied to casing 22, rollers 40 are moved to engage and provide a force onto cushion gum 34. Casing 22 is rotated while rollers 40 provide a force, in a direction indicated by arrow 38 in FIG. 4, onto cushion gum 34. In an exemplary embodiment, wheels 40 begin in the middle of crown 27 and, during subsequent rotations, wheels 40 are moved towards shoulders 21 of crown 27 in the directions indicated by arrows 41. This operation, often referred to as stitching, provides desirable adherence of cushion gum 34 to the surface of casing 22 (crown 27 and shoulders 21), while aiding in removing any trapped air pockets between cushion gum 34 and casing 22. After the stitching operation is completed, a measurement of the circumference of tire casing 22 plus cushion gum layer 34 is taken by measurement wheel 50 as casing 22 is rotated. Polyethylene layer 35 is then removed.

Based on the measured circumference of tire casing 22 with cushion gum layer 34 adhered thereto, a desired length of tire tread may be determined. In an exemplary embodiment, the determined length is dispensed from tread roll 64, as depicted in FIG. 3. The tread 68 is dispensed by drive rollers 66 beneath a retracted cutter 70 and through clamps 72 and 74 to a stop 75 which is extended upwardly above track 80. When end 76 engages stop 75, clamp 72 is selectively commanded to engage tread section 79 (adjacent end 76) to carry tread 79 along with movements of clamp 72. Stop 75 is then lowered and based on a determined length, roller 66 drives tread 68 pushing end 76 along track 80 and past clamp 74, while clamp 72 cooperatively propels tread end 76 along track 80. When an approximate desired length has been reached, based on aforementioned circumferential measure, drive 66 stops deploying tread 68 and clamp 72 stops propelling tread end 76.

In an exemplary embodiment, an operator may, once an approximate length of tread 68 has been deployed, make minor adjustments to a location of cut 78 in tread 68. It may be desirable for an operator to match the periodically repeating tread design of end 76 with the tread design at end 78. Matching the designs of ends 76 and 78 provide a preferred aesthetic appeal and structural strength, at the splice region in a completed retread tire by providing a continuously repeating tread design substantially unbroken by the splice. (In an alternative embodiment, the process of selecting the appropriate splice location, based on the tread design may be carried out by image processing devices which control the deployment of tread 68, location of end 78, and matching of designs on ends 76 and 78). Once the targeted location of end 78 is determined by an operator, or alternatively by automated methods, cutter 70 is used to cut section 79 away from tread 68 remaining behind knife 70 and on roll 64. Further, clamp 74 is clamped in a position adjacent end 78.

After end 78 has been created by cutter 70, clamp 72, which moves along track 80, pulls section 79 along track 80. End 76 is then put in contact with cushion gum 34 on casing 22 and application wheels 40 are lowered to engage end 76 of tread 79. An encoder is used to determine the location of end 76 relative to casing 22. The location of end 76 is substantially continuously communicated to a central processing unit or control unit. Casing 22 is then rotated while applicator wheels 40 provide a variably controlled pressure to tread 79. The applied pressure by wheels 40 provide adherence of tread 79 to cushion gum 34 and extend the overall length of tread 79 due to the force being exerted by applicator wheels 40 and the associated Poisson effect.

As casing 22 is rotated, the location of clamp 74 and hence end 78 of tread 79 is monitored. Further, because the location of edge 76 and the circumference of casing 22 with cushion gum 34 applied thereto is known, the circumferential distance yet to be covered by tread 79, may be deduced. By comparing the remaining circumferential distance to be covered and the amount of tread not yet applied, an appropriate force may be commanded to be applied by applicator wheels 40, to provide the appropriate amount of stretching and ultimately to match ends 76 and 78 with a gap having a gap length falling within a predetermined range.

Once the tread 79 has been applied, the operator may manually provide finishing operations to the splice area, or alternatively devices may be added to automatically finish the splice area. Finally, tire casing 22, may be removed from hub 20, and placed in a pressurized flexible envelope for curing.

Those who have skill in the art will recognize that the present invention is applicable with many different hardware configurations, software architectures, sensing and communication devices, and mechanical configurations.

While the detailed drawings, specific examples, and particular formulations given describe exemplary embodiments, they serve the purpose of illustration only. The materials and configurations shown and described may differ depending on the chosen performance characteristics and physical characteristics of tires and tire treads. For example, the layout and configuration of the tread bench may differ. The systems shown and described are not limited to the precise details and conditions disclosed. Furthermore, other substitutions, modifications, changes, and omissions may be made in the design, operating conditions, and arrangement of the exemplary embodiments without departing from the spirit of the invention as expressed in the appended claims.

What is claimed is:

1. A method of applying a length of tire tread having a first end and a second end to a tire casing having a layer of cushion gum applied thereto, the tire casing and the cushion gum having a circumference, the method comprising:

mounting the tire casing on a hub, the hub being rotatable;

measuring, automatically, the circumference of the tire casing and cushion gum;

dispensing along a track the length of tire tread based on the measured circumference of the casing and the cushion gum, the length of tire tread having a first end;

adjusting the length of tire tread along the track with respect to a cutter so that, after being cut, the first and a second end of the tread will provide a substantially continuous tread design when brought together on said tire casing;

cutting said length of tire tread to define the second end;

connecting an encoder to the tire tread at a determined distance from the second end;

moving the length of tire tread along the track to provide the length of tire tread to the casing;

applying the length of tire tread to the circumference of the tire casing and cushion gum;

monitoring the circumferential distance of the casing and cushion gum not covered by the tire tread;

monitoring the length of tire tread not applied to the casing and cushion gum by monitoring the location of the second end of the tire tread via the encoder; and controlling the pressure applied to the tire tread during application, the pressure applied to the tread based on the circumferential distance of the casing and cushion gum not covered by the tire tread and the length of tire tread not applied to the casing and cushion gum, so that the first and second ends of the tread will provide a continuous tread design when applied.

2. The method of claim 1, further comprising:
   moving the hub to align the tire casing with the tread.

3. The method of claim 1, further comprising:
   stitching the tire tread to the cushion gum.

4. The method of claim 1, further comprising:
   rotating the hub to pull the length of tire tread onto the cushion gum.

5. The method of claim 1, further comprising:
   engaging the tire tread with an application wheel configured to apply pressure to the tire tread.

6. The method of claim 1 wherein the length of tire tread has a periodically repeating tread design, and the length of the tire tread is defined by matching the tread design at the first and second ends thereof to provide a splice region, the splice region defined by the ends when applied to the tire casing, that has a substantially unbroken, continuously repeating tread design.

7. The method of claim 1 wherein in the controlling step, the circumferential distance of the casing and cushion gum not covered by the tire tread and the length of tire tread not applied to the casing and cushion gum are compared to command an appropriate pressure applied to the tread to apply the first and second ends of the length of tire tread onto the casing such that the ends define a gap, the gap having a gap length falling within a predetermined range.

8. The method of claim 6 wherein in the controlling step, the circumferential distance of the casing not covered by the tire tread and the length of tire tread not applied to the cushion gum are compared to command an appropriate pressure applied to the tread to apply the first and second ends of the length of tire tread onto the casing such that the ends define a gap, the gap having a gap length falling within a predetermined range.

9. The method of claim 1 wherein monitoring the circumferential distance of the casing not covered by the tire tread occurs substantially continuously.

10. The method of claim 1 wherein monitoring the length of the tread not applied to the casing and cushion gum occurs substantially continuously.

11. The method of claim 10 wherein monitoring the length of the tread not applied to the casing and cushion gum occurs substantially continuously.

12. The method of claim 1, wherein an encoder adapted to determine the location of the first end of the tire tread relative to the casing during the application of the tire tread to the casing is provided to monitor the circumferential distance of the casing and cushion gum not covered by the tire tread step.

13. The method of claim 1, wherein moving the length of tire tread along the track occurs without introducing any substantial bending or stretching of the tire tread.

* * * * *